(12) United States Patent
Signoff et al.

(10) Patent No.: US 8,988,852 B2
(45) Date of Patent: Mar. 24, 2015

(54) GROUND SHIELD CAPACITOR

(75) Inventors: David M. Signoff, Mountain View, CA (US); Wayne A. Loeb, San Francisco, CA (US)

(73) Assignee: Marvell World Trade Ltd., St. Michael (BB)

( * ) Notice: Subject to any disclaimer, the term of this patent is extended or adjusted under 35 U.S.C. 154(b) by 781 days.

(21) Appl. No.: 12/943,234

(22) Filed: Nov. 10, 2010

(65) Prior Publication Data

US 2011/0116208 A1    May 19, 2011

Related U.S. Application Data

(60) Provisional application No. 61/262,059, filed on Nov. 17, 2009.

(51) Int. Cl.
*H01G 4/005*    (2006.01)
*H01G 4/228*    (2006.01)
*H01G 4/002*    (2006.01)

(52) U.S. Cl.
CPC ............... *H01G 4/228* (2013.01); *H01G 4/002* (2013.01)
USPC ...................... 361/303; 361/301.1; 361/301.4; 361/306.1; 361/306.2

(58) Field of Classification Search
USPC .............. 361/301.1, 306.1, 306.2, 301.4, 303
See application file for complete search history.

(56) References Cited

U.S. PATENT DOCUMENTS

| | | | | |
|---|---|---|---|---|
| 5,208,725 A | * | 5/1993 | Akcasu | 361/313 |
| 5,414,588 A | * | 5/1995 | Barbee et al. | 361/304 |
| 5,760,456 A | * | 6/1998 | Grzegorek et al. | 257/531 |
| 5,831,331 A | * | 11/1998 | Lee | 257/659 |
| 5,854,625 A | | 12/1998 | Frisch et al. | |
| 6,383,858 B1 | * | 5/2002 | Gupta et al. | 438/238 |
| 6,385,033 B1 | * | 5/2002 | Javanifard et al. | 361/306.2 |
| 6,407,647 B1 | * | 6/2002 | Apel et al. | 333/25 |
| 6,452,249 B1 | * | 9/2002 | Maeda et al. | 257/531 |
| 6,743,671 B2 | * | 6/2004 | Hu et al. | 438/253 |
| 6,833,603 B1 | * | 12/2004 | Park et al. | 257/528 |
| 6,905,889 B2 | * | 6/2005 | Lowther | 438/3 |
| 7,154,161 B1 | * | 12/2006 | Blaschke et al. | 257/531 |
| 7,154,734 B2 | * | 12/2006 | Schultz et al. | 361/306.1 |
| 7,382,219 B1 | * | 6/2008 | Lee | 336/84 C |
| 7,485,912 B2 | * | 2/2009 | Wang | 257/307 |
| 7,787,233 B1 | * | 8/2010 | Chen et al. | 361/306.1 |
| 7,956,438 B2 | * | 6/2011 | Quinn | 257/516 |
| 7,978,456 B2 | * | 7/2011 | Fong et al. | 361/306.2 |
| 7,994,609 B2 | * | 8/2011 | Quinn | 257/532 |
| 7,994,610 B1 | * | 8/2011 | Quinn | 257/532 |
| 8,000,083 B2 | * | 8/2011 | Fong et al. | 361/321.2 |
| 8,014,124 B2 | * | 9/2011 | Lin | 361/306.3 |

(Continued)

OTHER PUBLICATIONS

International Searching Authority, "International Search Report", Application No. PCT/US2010/056153, Jan. 10, 2011.

*Primary Examiner* — Dion R Ferguson (57) ABSTRACT

In one embodiment, an apparatus includes a first reference voltage coupled to a first metal layer and a second reference voltage coupled to a second metal layer. A first finger type in the plurality of fingers is coupled to the first metal layer at a first area and coupled to the first metal layer and the second metal layer at a second area. A second finger type in the plurality of fingers is coupled to the second metal layer at the first area and coupled to the first metal layer and the second metal layer at the second area. Also, the first finger type and the second finger type alternately positioned next to each other.

10 Claims, 8 Drawing Sheets

(56) References Cited

U.S. PATENT DOCUMENTS

| | | | |
|---|---|---|---|
| 8,027,144 B2* | 9/2011 | Chiu et al. | 361/301.4 |
| 8,106,479 B1* | 1/2012 | Nathawad | 257/533 |
| 8,207,592 B2* | 6/2012 | Quinn | 257/532 |
| 8,559,186 B2* | 10/2013 | Jin | 361/794 |
| 8,610,247 B2* | 12/2013 | Yen et al. | 257/531 |
| 8,675,368 B2* | 3/2014 | Cho | 361/777 |
| 2001/0004314 A1 | 6/2001 | Copetti et al. | |
| 2002/0158305 A1* | 10/2002 | Dalmia et al. | 257/531 |
| 2004/0195692 A1* | 10/2004 | Adan | 257/758 |
| 2005/0018380 A1 | 1/2005 | Yeo et al. | |
| 2005/0051869 A1* | 3/2005 | Watanabe | 257/531 |
| 2005/0135042 A1 | 6/2005 | Fong et al. | |
| 2006/0049481 A1* | 3/2006 | Tiemeijer et al. | 257/531 |
| 2006/0061935 A1* | 3/2006 | Schultz et al. | 361/306.1 |
| 2006/0157798 A1* | 7/2006 | Hayashi et al. | 257/374 |
| 2006/0163692 A1* | 7/2006 | Detecheverry et al. | 257/531 |
| 2006/0202776 A1* | 9/2006 | Lee et al. | 333/25 |
| 2007/0052062 A1* | 3/2007 | Ding et al. | 257/528 |
| 2007/0159286 A1* | 7/2007 | Huang et al. | 336/200 |
| 2007/0235838 A1* | 10/2007 | Wang | 257/532 |
| 2008/0020488 A1* | 1/2008 | Clevenger et al. | 438/3 |
| 2008/0237789 A1* | 10/2008 | He et al. | 257/531 |
| 2008/0290454 A1* | 11/2008 | Fujii | 257/529 |
| 2009/0051466 A1 | 2/2009 | Nishijima | |
| 2009/0085133 A1* | 4/2009 | Doan | 257/428 |
| 2009/0090995 A1* | 4/2009 | Yang et al. | 257/531 |
| 2009/0109597 A1* | 4/2009 | Anthony | 361/306.3 |
| 2009/0183358 A1* | 7/2009 | Jow et al. | 29/602.1 |
| 2009/0322447 A1* | 12/2009 | Daley et al. | 333/185 |
| 2010/0026368 A1* | 2/2010 | Tang et al. | 327/361 |
| 2010/0127347 A1* | 5/2010 | Quinn | 257/532 |
| 2010/0141354 A1* | 6/2010 | Cho | 333/160 |
| 2010/0193904 A1* | 8/2010 | Watt et al. | 257/531 |
| 2010/0214041 A1* | 8/2010 | Cho | 333/238 |
| 2010/0232085 A1* | 9/2010 | Wang | 361/303 |
| 2010/0301987 A1* | 12/2010 | Belot et al. | 336/222 |
| 2010/0309605 A1* | 12/2010 | Lin | 361/306.3 |
| 2011/0001504 A1* | 1/2011 | Cho et al. | 324/756.01 |
| 2011/0090024 A1* | 4/2011 | Chen et al. | 333/174 |
| 2011/0199715 A1* | 8/2011 | Herberholz | 361/306.1 |
| 2011/0254132 A1* | 10/2011 | Cho | 257/534 |
| 2011/0278699 A1* | 11/2011 | Lin | 257/532 |

* cited by examiner

GROUND SHIELD CAPACITOR

CROSS REFERENCE TO RELATED APPLICATIONS

The present disclosure claims priority to U.S. Provisional App. No. 61/262,059 for "Ground Shield Capacitor" filed Nov. 17, 2009, which is incorporated herein by reference in its entirety for all purposes.

BACKGROUND

Particular embodiments generally relate to ground shield capacitors.

Unless otherwise indicated herein, the approaches described in this section are not prior art to the claims in this application and are not admitted to be prior art by inclusion in this section.

For a passive component, such as an inductor or transformer, the area under the passive component in an integrated circuit (IC) chip is often left unused. This avoids the impact of the passive component on circuits under the passive component and the impact of the circuit on the passive component. The impacts include electric coupling (capacitive) and magnetic coupling (eddy currents).

A ground shield may be placed under the passive component to terminate electric fields resulting from electric coupling. Additionally, the performance of the passive component may be improved by the use of the ground shield. For example, the ground shield may increase an inductor's quality factor (Q). Also, the electric coupling between the passive component and a substrate or another structure under the passive component may be reduced. However, it is possible that ground shields will not block eddy currents, and thus, even when a ground shield is used, circuits are often not placed under the passive component.

Not having anything under the passive component may cause problems in chip fabrication. For example, it is better for chip fabrication to maintain the density of each metal layer between an upper limit and a lower limit. A passive component made with a high-level metal and nothing under the high-level metal layer violates density rules for lower-level metal. Workarounds exist that place metal fill around the passive component. However, the fill takes up additional area. Using a ground shield on a metal layer under the passive component will meet metal density rules without a guard ring of metal fill.

Figure 1:
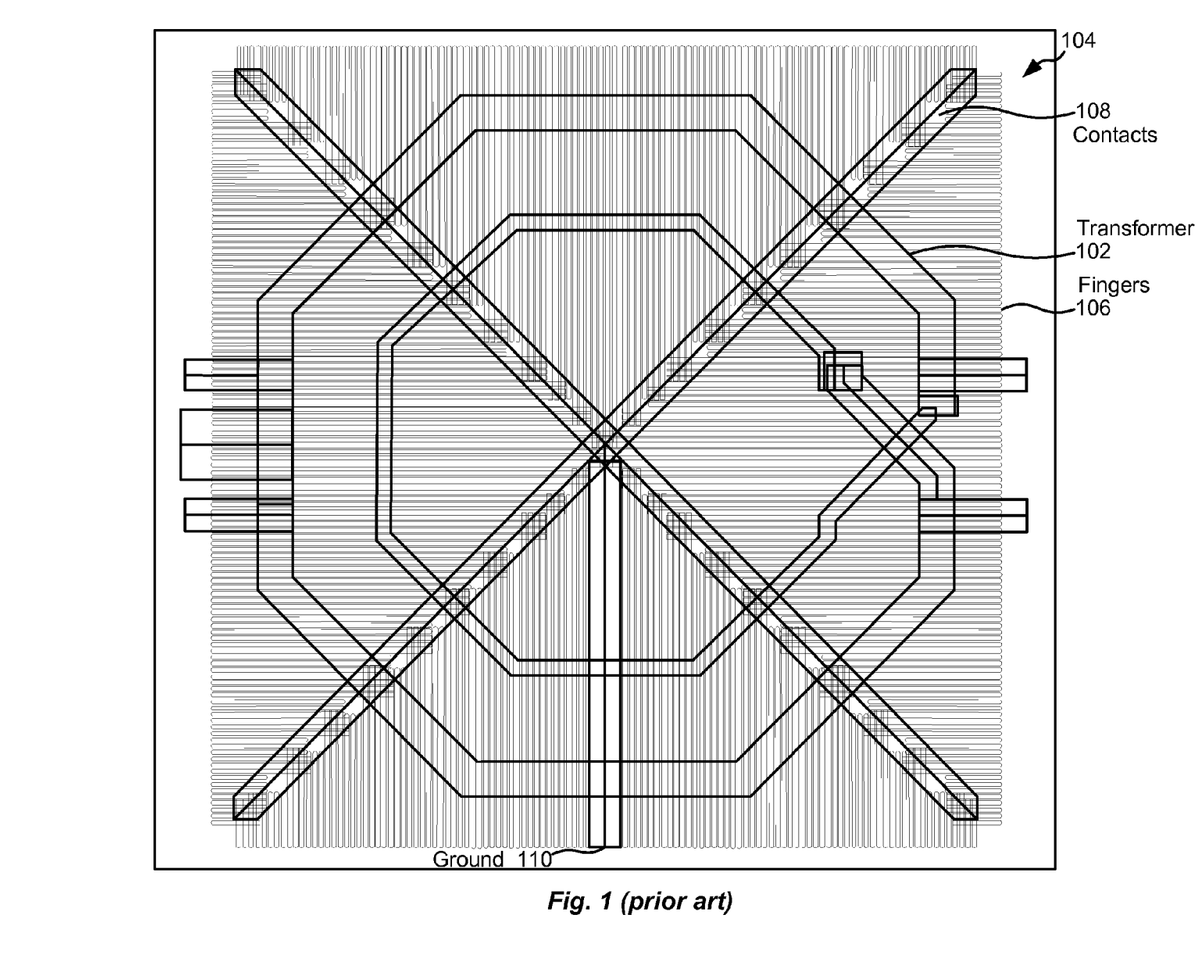
FIG. 1 shows an example of a transformer with a conventional ground shield for an integrated circuit (IC) chip.

FIG. 1 shows an example of a transformer 102 with a conventional ground shield 104 for an integrated circuit (IC) chip. Although transformer 102 is shown, another passive component may be used. Transformer 102 in this example includes two coils, a primary coil and a secondary coil.

Ground shield 104 is situated under transformer 102 and includes a plurality of fingers 106. Fingers 106 include gaps in between them that do not allow a circle of current to flow around ground shield 104, which avoids the adverse effects of eddy currents.

Each finger 106 is coupled to contacts 108. This couples the fingers to a ground 110. Also, fingers 106 are all coupled to the same layers of metal.

In addition to ground shield 104, the chip may include a de-coupling capacitor. In some radio frequency circuits, a high frequency current is pulled from the supply. Bond wire inductance acts as a large impedance at high frequencies. So, an alternating current (AC) low impedance path to ground is required on the chip. Typically, a large de-coupling capacitor between supply and ground is used. These de-coupling capacitors require significant area on the chip.

Figure 2:
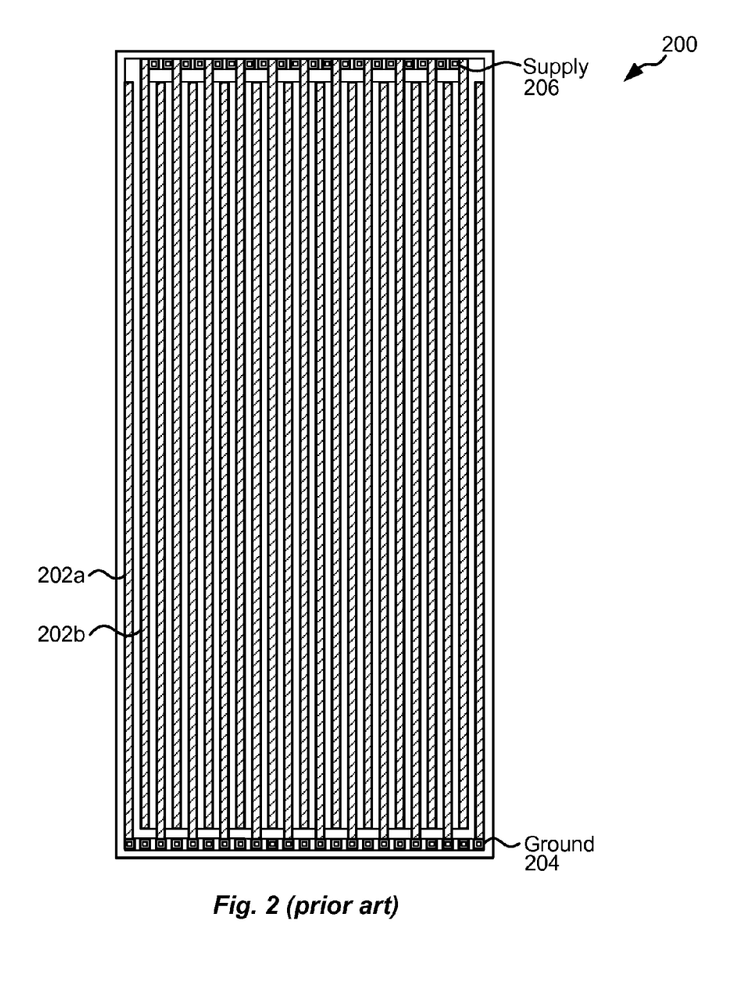
FIG. 2 shows an example of a conventional MOM capacitor.

One example of a de-coupling capacitor that may be used is a metal-oxide-metal (MOM) capacitor. FIG. 2 shows an example of a conventional MOM capacitor 200. MOM capacitor 200 includes a plurality of metal lines 202. Odd metal lines 202a may be connected to a first connection at the bottom, which may be connected to ground 204. Even metal lines 202b may be connected to a second connection at the top, which may be connected to a supply 206. Odd metal lines 202a and even metal lines 202b alternate in MOM capacitor 200. Capacitance between even metal lines 202b and odd metal lines 202a is then formed.

Conventionally, ground shield 104 and MOM capacitor 200 are separate structures in different areas of the chip. Having separate structures may be an inefficient use of area on the chip.

SUMMARY

In one embodiment, an apparatus includes a first reference voltage coupled to a first metal layer and a second reference voltage coupled to a second metal layer. A first finger type in the plurality of fingers is coupled to the first metal layer at a first area and coupled to the first metal layer and the second metal layer at a second area. A second finger type in the plurality of fingers is coupled to the second metal layer at the first area and coupled to the first metal layer and the second metal layer at the second area. Also, the first finger type and the second finger type alternately positioned next to each other.

In one embodiment, the first finger type is coupled to a third metal layer at the first area and coupled to the third metal layer and a fourth metal layer at the second area. The second finger type is coupled to the fourth metal layer at the first area and coupled to the third metal layer and the fourth metal layer at the second area.

In one embodiment, the first finger type is coupled to a third finger type at the first metal layer at the first area. The second finger type is coupled to the third finger type at the second metal layer at the first area.

In one embodiment, a system includes a passive device, where the apparatus is included under the passive device.

In one embodiment, a method includes coupling a first reference voltage to a first finger type in the plurality of fingers on a first metal layer at a first area and coupling the first reference voltage to the first metal layer and a second metal layer at a second area. The method also includes coupling a second reference voltage to a second finger type in the plurality of fingers on the second metal layer at the first area and coupling the second reference voltage to the first metal layer and the second metal layer at the second area. The first finger type and the second finger type are alternately positioned next to each other.

In one embodiment, the method includes coupling the first reference voltage through a third finger type on the first metal layer and coupling the second reference voltage through the third finger type on the second metal layer. The first finger type is coupled to the first metal layer at the third finger type and the second finger type is coupled to the second metal layer at the third finger type.

The following detailed description and accompanying drawings provide a more detailed understanding of the nature and advantages of the present invention.

DETAILED DESCRIPTION

Described herein are techniques for a ground shield capacitor. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 3:
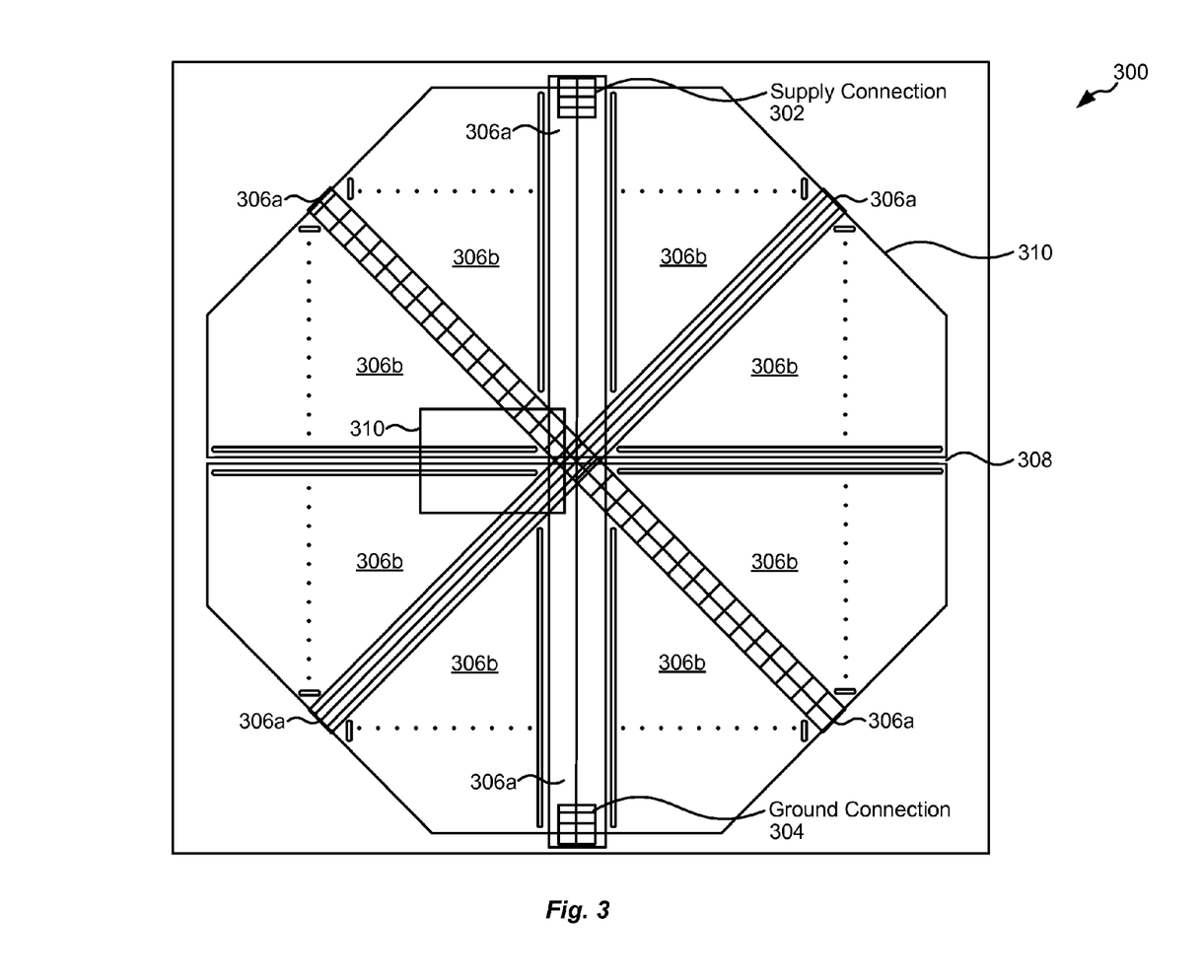
FIG. 3 shows an example of a ground shield capacitor according to one embodiment.

FIG. 3 shows an example of a ground shield capacitor 300 according to one embodiment. Ground shield capacitor 300 provides a capacitor that is in the shape of a ground shield and offers features provided by both a ground shield and an AC decoupling capacitor. Ground shield capacitor 300 may be placed under the area of a passive component, such as a transformer, an inductor, or a balun in an IC chip.

Ground shield capacitor 300 includes a supply connection 302 that couples ground shield capacitor 300 to a first reference voltage, such as a supply voltage. A ground connection 304 couples ground shield capacitor 300 to a second reference voltage, such as ground. In one embodiment, supply connection 302 is on different metal layers from ground connection 304. For example, supply connection 302 is on metal layers 1 and 3 and ground connection 304 is on metal layers 2 and 4.

Ground shield capacitor 300 includes a plurality of fingers 306. Fingers 306 may be conductive metal lines in the chip. Fingers 306 are arranged in a radial structure around ground shield capacitor 300. For example, fingers 306 extend outwardly from a point and are arranged in a circular manner. Different radial structures may be used in which fingers 306 are arranged around ground shield capacitor 300. Although radial structures are described, other non-radial structures may be used.

Fingers 306 may include primary fingers 306a and secondary fingers 306b. Although primary fingers 306a and secondary fingers 306b are described, other arrangements may be used. Primary fingers 306a may provide connection points for secondary fingers 306b. In one embodiment, a first secondary finger 306b may be considered a first finger type, a second secondary finger 306b may be considered a second finger type, and primary finger 306a may be considered a third finger type. Primary fingers 306a may carry supply and ground on alternating metal layers, i.e., the metal layers 1 and 3 of primary fingers 306a are coupled to supply connection 302 and the metal layers 2 and 4 of primary fingers 306a are coupled to ground connection 304.

Certain secondary fingers 306b are connected together by vias (not shown) to metal layers, such as metal layers 1, 2, 3, and 4, except at an inner edge that connects to primary fingers 306a. Although metal layers 1-4 are mentioned, other metal layers may be used. As will be described in more detail below, alternating secondary fingers 306b connect with either supply connection 302 or ground connection 304. For example, a first secondary finder 306b is coupled to metal layers 1 and 3 and a second secondary finger 306b is coupled to metal layers 2 and 4.

Capacitors are formed between secondary fingers 306b because the connections on alternating secondary fingers 306b are to supply and then ground, which creates a potential difference across secondary fingers 306b. The capacitors do not create paths for eddy currents (e.g., circular current paths) because the eddy currents see every capacitor that is formed by secondary fingers 306b in series. The capacitors in series create a high impedance for eddy currents, which minimizes the eddy currents that can flow. Additionally, gaps 308 provide additional protection by adding high impedance for eddy currents by breaking the capacitors at certain points. However, the capacitors are in parallel from supply to ground creating a low impedance path from supply to ground, which is desirable.

Figure 4:
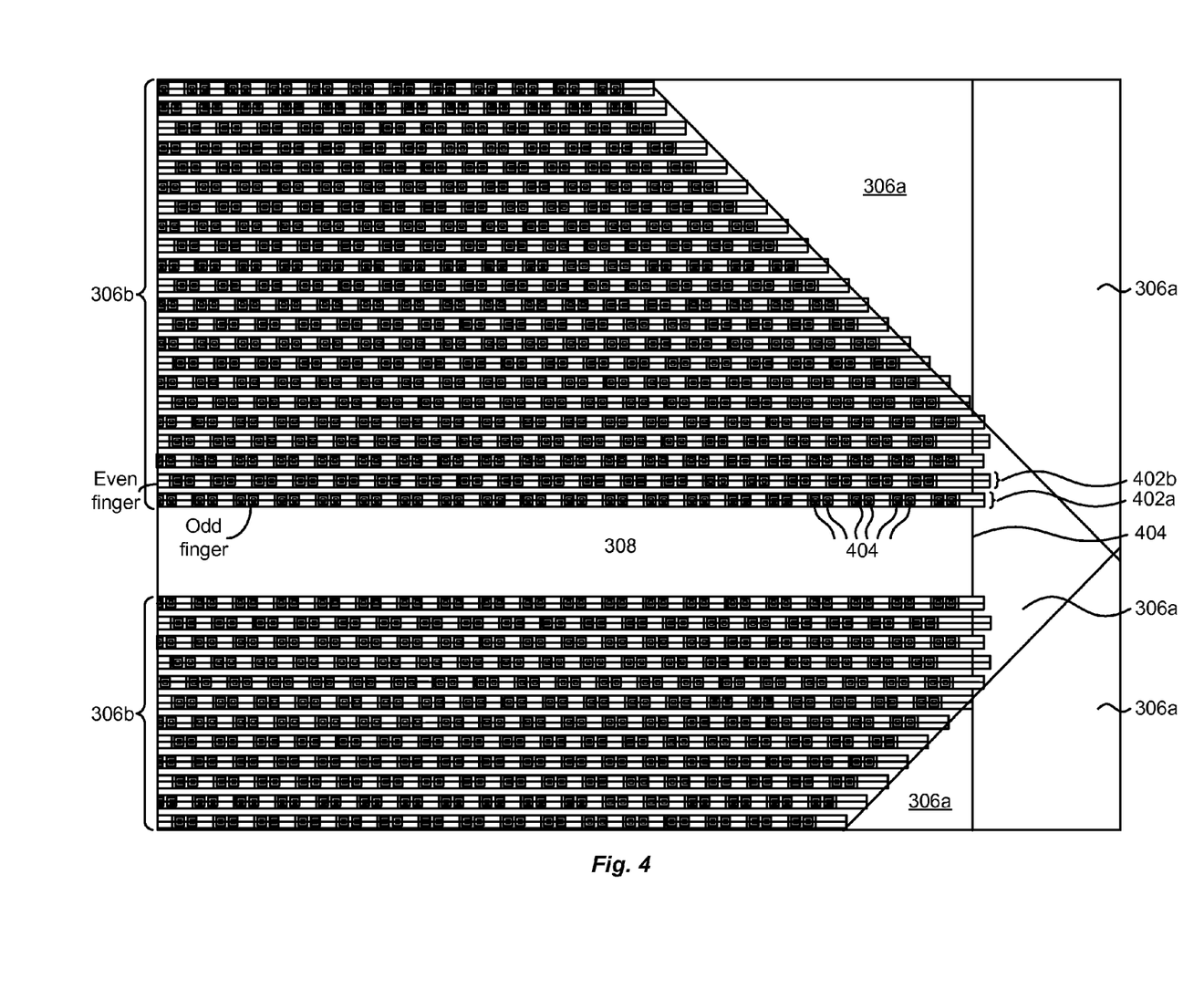
FIG. 4 shows a zoomed-in version of an area shown in FIG. 3 according to one embodiment.

FIG. 4 shows a zoomed-in version of an area 310 shown in FIG. 3 according to one embodiment. Other areas of ground shield capacitor 300 are similar. Primary fingers 306a are shown along with secondary fingers 306b. As discussed above, alternating secondary fingers 306b connect with either metal layers 1 and 3 or metal layers 2 and 4. For example, at 402a, a first connection with primary finger 306a for an odd secondary finger 306b is shown. First connection 402a may be on metal layers 1 and 3. At a second connection 402b, an even secondary finger 306b is connected to primary finger 306a. Second connection 402b may be on metal layers 2 and 4. The pattern continues as every other secondary finger 306b connects to either metal layers 1 and 3 or metal layers 2 and 4 in a first area at the inner edge of secondary fingers 306b.

At a second area, vias 404 may be used to couple fingers 306b to all four metal layers 1, 2, 3, and 4. This couples all four metal layers to ground or supply in an alternating manner. This structure creates capacitance between even fingers 306b and odd fingers 306b.

Figure 5:
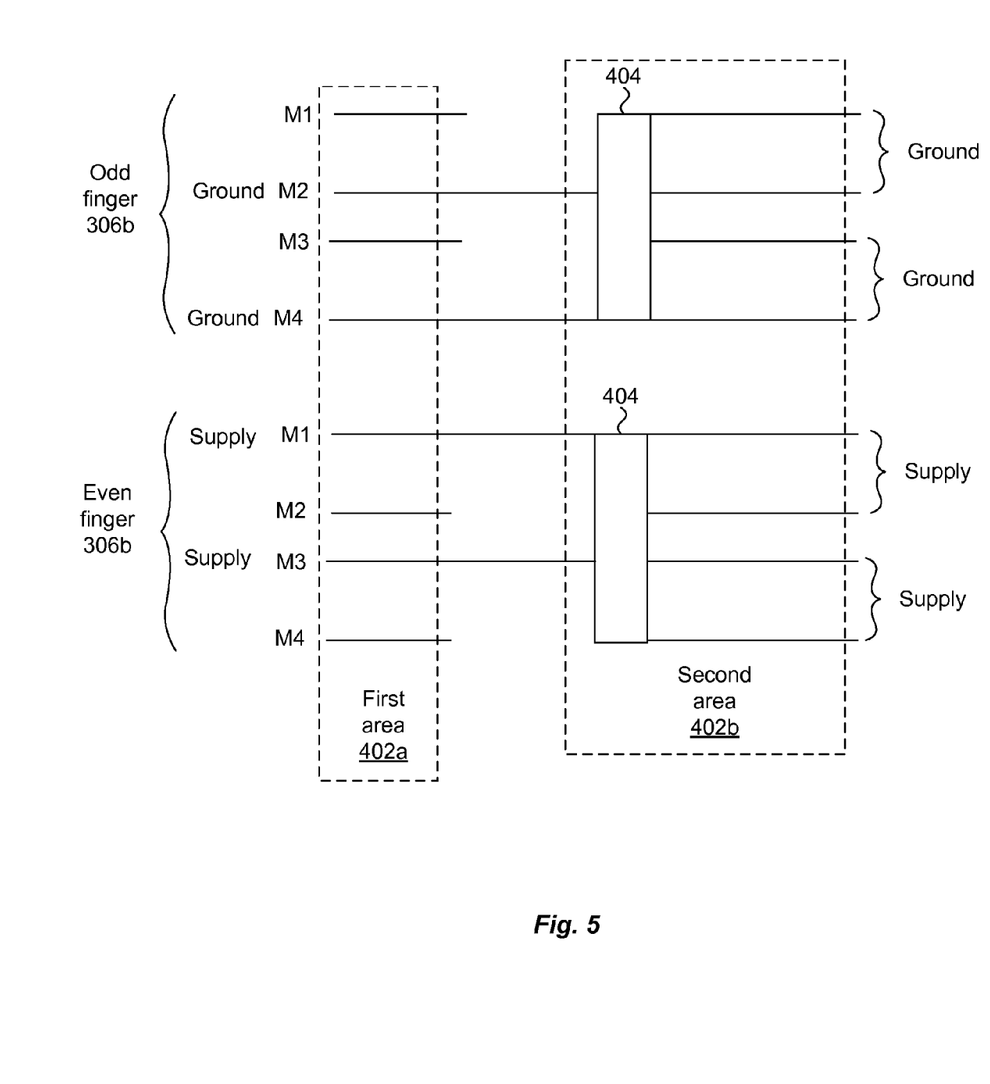
FIG. 5 shows an example of a side view of metal layers 1, 2, 3, and 4 according to one embodiment.

A side view shows the connections of even fingers 306b and odd fingers 306b at the first area and second area. FIG. 5 shows an example of a side view of metal layers 1, 2, 3, and 4 according to one embodiment. An odd finger 306b and an even finger 306b are shown.

Odd finger 306b is connected to metal layers 2 (M2) and 4 (M4). Metal layers 2 and 4 are coupled to ground at a first area 402a at primary finger 306a. Even finger 306b is coupled to metal layers 1(M1) and 3(M3) at first area 402a at primary finger 306a. Metal layers 1 and 3 are coupled to the supply at primary finger 306a.

Vias 404 couple the metal layers together at a second area 402b. For example, via 404 couples metal layers 1, 2, 3, and 4 together. For odd secondary finger 306a, this couples all four metal layers to ground. For even secondary finger 306b, via 404 couples all four metal layers to the supply. Although only one set of vias 404 are shown, vias 404 may be located at multiple points on secondary fingers 306b.

Because odd secondary finger 306b and even secondary finger 306b are next to each other and either coupled to ground or supply, capacitance is formed between them. However, because within a secondary finger 306b metal layers are coupled to either ground or supply, vertical capacitance does not occur.

Ground shield capacitor 300 terminates electric fields like a conventional ground shield. Also, ground shield capacitor 300 minimizes eddy currents because every capacitor is seen in series. However, parallel capacitance creates a low impedance from supply to ground. This couples the supply to AC ground. In some radio frequency (RF) circuits, high frequency current is pulled from the supply. The path from supply to ground sees a parallel capacitance that creates a low impedance from supply to ground. This provides the desired low impedance AC coupling from the supply to ground.

Figure 6:
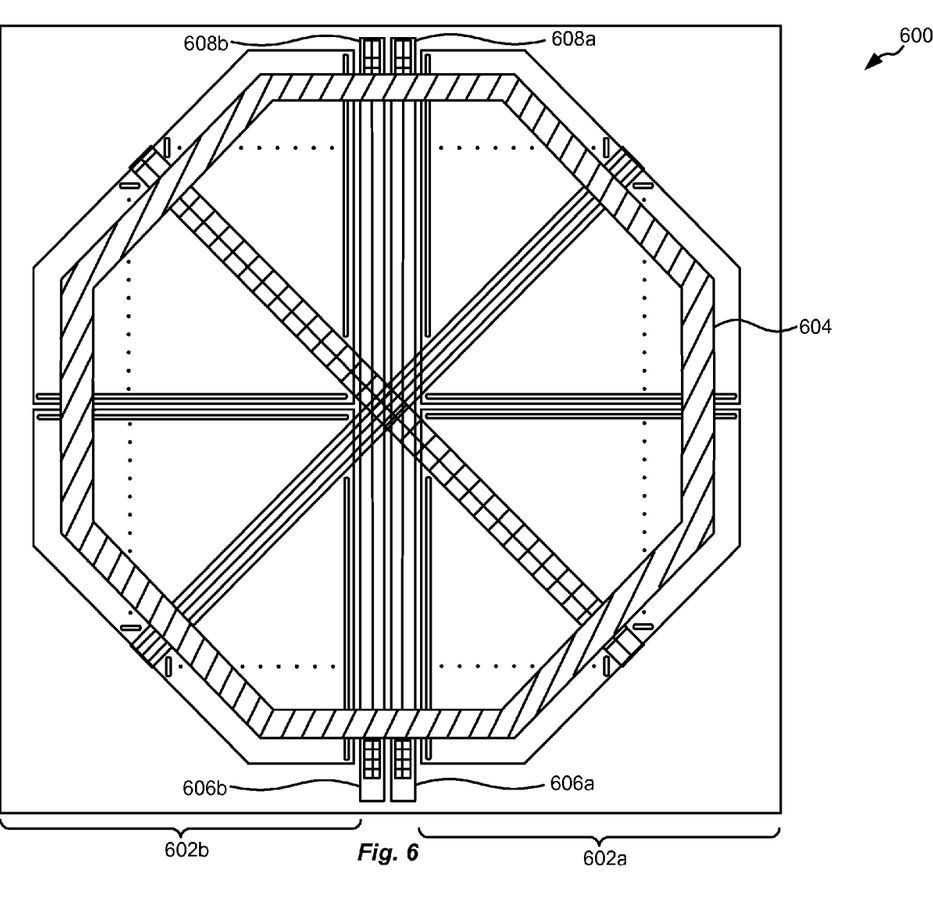
FIG. 6 shows an example of an alternating current (AC) coupling ground shield according to one embodiment.

Other uses may also be possible for ground shield capacitor 300. FIG. 6 shows an example of an AC coupling ground shield 600 according to one embodiment. AC coupling ground shield 600 includes a first capacitor 602a and a second capacitor 602b. First capacitor 602a and second capacitor 602b are split between right and left sections of AC coupling ground shield 600, respectively. AC coupling ground shield 600 acts as two AC coupling capacitors from a first stage to a second stage in the IC chip.

In this example, AC coupling ground shield 600 may be placed under an inductor 604; however, other passive components may be used. The same structure as described above with ground shield capacitor 600 may be used for AC coupling ground shield 600. However, the difference is that two separate capacitors are being formed by AC coupling ground shield 600. For example, first AC coupling capacitor 602a has an input P 606a and an output P 608a and second AC coupling capacitor 602b has an input N 606b and an output N 608b.

Another use for ground shield capacitor 300 is to provide differential tuning capacitance. Inductors and transformers may need some additional capacitance in parallel to be tuned to a desired frequency. In this case, ground shield capacitor 300 may be placed under the inductor or transformer. The inductor or transformer may then be tuned to resonate at the desired frequency using the capacitance of ground shield capacitor.

Figure 7:
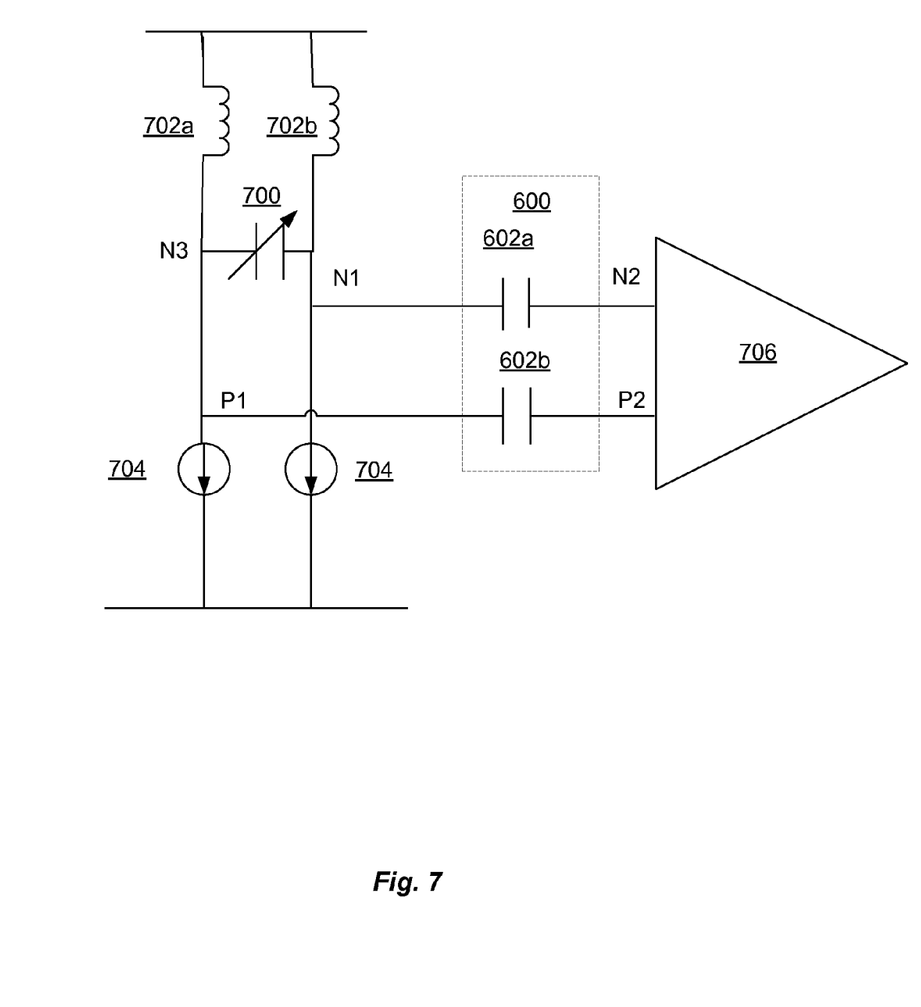
FIG. 7 shows an example of a circuit diagram in which the AC coupling ground shield and a tuning ground shield capacitor may be used.

FIG. 7 shows an example of a circuit diagram in which AC coupling ground shield 600 and a tuning ground shield capacitor 700 may be used. As shown, inductors 702a/b are provided along with current sources 704 in a first stage. A second stage includes an amplifier 706. AC coupling capacitors are needed in between the first stage and second stage. In one example, AC coupling ground shield capacitor 600 is placed under inductors 702a/b in the chip. For example, referring to FIG. 6, the right section of AC coupling ground shield 600 may form a first AC coupling capacitor 602a and the left side of AC coupling ground shield 600 forms a second capacitor 602b. In this case, an input N 606a is coupled to a node N1 and an output N 608a is coupled to a node N2. An input P 606b is coupled to a node P1 and an output P 608b is coupled to a node P2 in the circuit diagram. By placing AC coupling ground shield capacitor 600 under inductors 702, the first and second stage may be moved closer together in the chip, which may use less area on the chip.

Tuning ground shield capacitor 700 is coupled in between first inductor 702a and second inductor 702b. If ground shield capacitor 300 is used, the supply connection may be coupled instead to a node N3 and the ground connection may be coupled instead to node N1. Thus, connections to supply and ground are substituted for coupling a tuning capacitor across inductors 702a and 702b together.

Accordingly, various implementations of a ground shield capacitor are provided. For example, ground shield capacitor 300 as described in FIG. 3 is coupled from supply to ground. AC coupling ground shield capacitors 600 AC couple a first stage to a second stage. And finally, a tuning ground shield capacitor 700 couples across a passive component or pair of passive components to provide tuning capacitance. Other connections and implementations may also be used.

Accordingly, capacitors may be placed under passive components. This may allow the modeling of the capacitor and passive component separately. For AC coupling ground shield capacitors, separate modeling is allowed because small errors in the capacitance of the AC coupling ground shield capacitor do not impact the circuit as long as the capacitance is large enough. However, for a tuning ground shield capacitor, the passive component and capacitor may be modeled as a single unit to achieve the exact tuning of the desired frequency.

Figure 8:
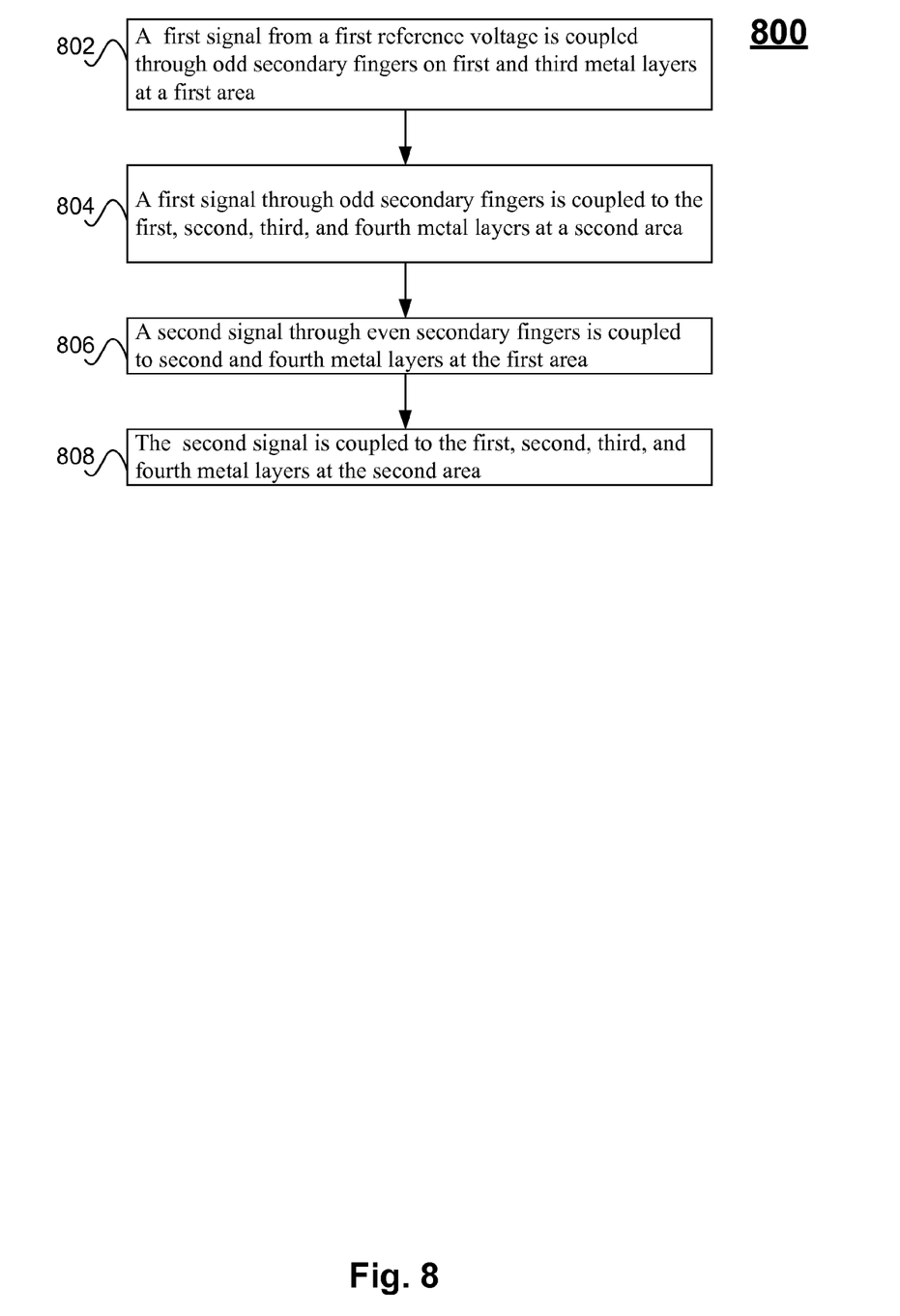
FIG. 8 shows a flowchart of a method for providing a ground shield capacitor according to one embodiment.

FIG. 8 shows a flowchart 800 of a method for providing a ground shield capacitor according to one embodiment. At 802, a first signal from a first reference voltage is coupled through odd secondary fingers 306b on first and third metal layers at a first area. For example, a supply voltage may be coupled to metal layers 1 and 3.

At 804, the first signal through odd secondary fingers 306b is coupled to the first, second, third, and fourth metal layers at a second area. At 806, a second signal through even secondary fingers 306b is coupled to second and fourth metal layers at the first area. At 808, the second signal is coupled to the first, second, third, and fourth metal layers at the second area. Accordingly, at the second area, odd secondary fingers 306b are coupled to the first reference voltage and even secondary fingers 306b are coupled to the second reference voltage.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. An integrated circuit comprising:
    a passive device; and
    a ground shield capacitor arranged under the passive device, wherein the ground shield capacitor comprises:
        a first metal layer coupled to a supply voltage;
        a second metal layer coupled to a ground potential; and
        a plurality of fingers arranged radially, wherein the plurality of fingers includes (i) a plurality of fingers of a first type, (ii) a plurality of fingers of a second type, and (iii) a plurality of fingers of a third type,
        wherein a first finger of the third type couples the plurality of fingers of the first type to the first metal layer,
        wherein a second finger of the third type couples the plurality of fingers of the second type to the second metal layer,
        wherein each finger of the first type is respectively alternately positioned next to a corresponding finger of the second type,
        wherein capacitances form between (i) the plurality of fingers of the first type connected to the supply voltage via the first metal layer and (ii) the plurality of fingers of the second type connected to the ground potential via the second metal layer, wherein gaps between the capacitances create a high impedance for eddy currents, wherein the capacitances create a low impedance AC coupling from the supply voltage to the ground potential, wherein the plurality of fingers of the first type is further coupled to a third metal layer through vias that connect the first metal layer to the third metal layer, wherein the plurality of fingers of the second type is further coupled to a fourth metal layer through vias that connect the second metal layer to the fourth metal layer, wherein the plurality of fingers extend beyond a periphery of the passive device, and wherein the passive device is tuned to resonate at a predetermined frequency using the capacitances of the ground shield capacitor.

2. The integrated circuit of claim 1, wherein the passive device comprises an inductor or a transformer.

3. The integrated circuit of claim 1, wherein the fingers of the first type and the second type are parallel to each other.

4. The integrated circuit of claim 1, wherein the fingers of the first type are connected to the first finger of the third type at an angle of less than ninety degrees.

5. The integrated circuit of claim 1, wherein the fingers of the second type are connected to the second finger of the third type at an angle of less than ninety degrees.

6. A method comprising:

coupling a first metal layer to a supply voltage;

coupling a second metal layer to a ground potential;

arranging, radially, a plurality of fingers including (i) a plurality of fingers of a first type, (ii) a plurality of fingers of a second type, and (iii) a plurality of fingers of a third type by coupling the plurality of fingers of the first type to the first metal layer using a first finger of the third type, coupling the plurality of fingers of the second type to the second metal layer using a second finger of the third type, and positioning each finger of the first type respectively alternately next to a corresponding finger of the second type, wherein capacitances form between (i) the plurality of fingers of the first type connected to the supply voltage via the first metal layer and (ii) the plurality of fingers of the second type connected to the ground potential via the second metal layer, wherein gaps between the capacitances create a high impedance for eddy currents, and wherein the capacitances create a low impedance AC coupling from the supply voltage to the ground potential;

coupling the plurality of fingers of the first type to a third metal layer through vias that connect the first metal layer to the third metal layer;

coupling the plurality of fingers of the second type to a fourth metal layer through vias that connect the second metal layer to the fourth metal layer;

arranging, under a passive device in an integrated circuit, a ground shield capacitance including the capacitances formed by (i) the plurality of fingers, and (ii) the first through fourth metal layers;

extending the plurality of fingers beyond a periphery of the passive device; and tuning the passive device to resonate at a predetermined frequency using the capacitances of the ground shield capacitor.

7. The method of claim 6, wherein the passive device comprises an inductor or a transformer.

8. The method of claim 6, wherein positioning each finger of the first type respectively alternately next to the corresponding finger of the second type comprises arranging the fingers of the first type and the second type parallel to each other.

9. The method of claim 6, wherein coupling the plurality of fingers of the first type to the first metal layer using the first finger of the third type comprises connecting the plurality of fingers of the first type to the first finger of the third type at an angle of less than ninety degrees.

10. The method of claim 6, wherein coupling the plurality of fingers of the second type to the second metal layer using the second finger of the third type comprises connecting the plurality of fingers of the second type to the second finger of the third type at an angle of less than ninety degrees.

* * * * *